Nov. 23, 1965 W. S. MILLER 3,218,924
REAR PROJECTION SCREEN
Filed June 25, 1962 3 Sheets-Sheet 1

WENDELL S. MILLER
INVENTOR.

BY William P. Green
ATTORNEY

Nov. 23, 1965

W. S. MILLER 3,218,924

REAR PROJECTION SCREEN

Filed June 25, 1962

WENDELL S. MILLER
INVENTOR.

BY William P. Green
ATTORNEY

3,218,924
REAR PROJECTION SCREEN
Wendell S. Miller, 1341 Comstock Ave., Los Angeles, Calif.
Filed June 25, 1962, Ser. No. 204,838
3 Claims. (Cl. 88—28.93)

This invention relates to an improved type of rear projection screen, that is, a screen adapted to have an image projected onto it from a location at the back of the screen, with the image then being transmitted through the screen for viewing from its front side.

In many instances in which rear projection screens are utilized, it is desirable to be able to use the screens, and view images on them, even though there may be a substantial amount of ambient light or reflected light falling on the screen in addition to that of the image. Such ambient or reflected light, however, tends to illuminate the areas of the image which are intended to be black, in the case of most conventional screens, and therefore decreases the contrast in the image as viewed.

The general object of the present invention is to provide an improved type of rear projection screen which is so designed as to substantially completely eliminate the above discussed tendency for loss of contrast in a projected image as a result of the impingement of stray light on the screen. As will appear, a screen embodying the invention is so constructed as to virtually ignore the presence of stray light in the area, either in front of or behind the screen, so that even though the viewing area and projection area are lighted relatively brightly, a projected image on the screen still appears to a viewer in sharp contrast, with the black or dark areas of the image being just as dark as if in a completely darkened room.

To prevent stray light at the front of the screen from affecting the appearance of the image, the screen is so designed that its front or viewing side can not reflect light in a manner such that it is visible to a viewer. In one form of the invention, the front side of the screen may be capable of reflecting front light specularly but not diffusely, and in a particular direction not affecting the appearance of the image. In certain other presently preferred forms of the invention, however, the front of the screen is predominantly light absorptive and non-reflective in all respects, that is, it can not reflect light either specularly or diffusely.

A screen embodying the invention avoids response to stray light at the back side of the screen by special construction of the screen in a manner such that it can pick up or respond to light only from the direction of the projector. Other light at the back side of the screen is reflected by the screen without being transmitted to its viewing side.

Structurally, a screen constructed in accordance with the invention includes a large number of light guides distributed at different locations across the face of the screen, and positioned to receive different portions of the projected image, and transmit those portions through the thickness of the screen to its viewing side. These light guides have reflective side walls which reflect inwardly light passing through the guides. Also, these guides taper in advancing from the projection side of the screen toward its viewing side, to form relatively large cross-section inlet ends of the guides near the projection side, and smaller cross-section outlet ends near the viewing side. The small cross-section outlet ends of the different light guides form a large number of minute spaced illuminated areas which are seen by the viewer, and which form together a composite visible image. Between and about the small illuminated areas, the visible side of the screen is formed of a material capable of giving to the screen its discussed non-reflective or only specularly reflective characteristics. This material may be defined broadly as having a visible surface of low diffuse albedo, preferably less than 10%.

The tapering configuration of the light guides enables each individual guide to pick up light from a relatively large area at the projection side of the screen, and guide that light into the desired very small visible area at the viewing side of the screen. Also, the taper of the guides causes them to reflect stray light away from the screen without transmitting it through the screen to its viewing side.

It is found most desirable to form the guides as solid elements of transparent material, such as glass or plastic, with the surfaces of these elements tapering and serving to reflect light internally to attain the discussed wave guide function. Also, for maximum facility of construction, the guides may all be carried by and integral with a sheet of glass or other transparent material, with the guides forming small tapered lugs at one side of this sheet.

The above and other features and objects of the present invention will be better understood from the following detailed description of the typical embodiments illustrated in the accompanying drawings, in which.

Figure 1:
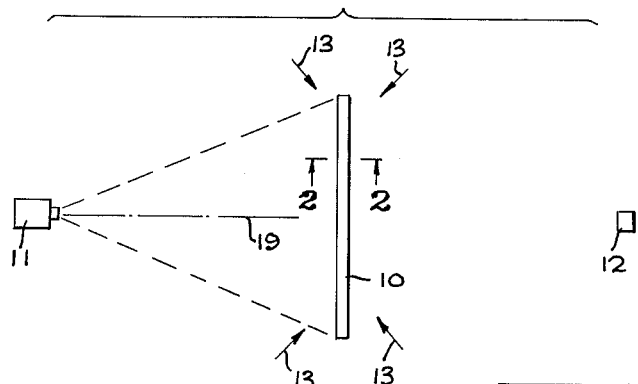
FIG. 1 is a plan view representing somewhat diagrammatically a rear projection system in which the present screen may be employed.

In FIG. 1, I have represented the screen of the invention at 10, with an illuminated image being projected onto the screen from its left side by a conventional motion picture or still projector 11. The image projected on the screen 10 is viewed from its right side as by a viewer represented diagramamtically at 12. In the FIG. 1 arrangement, it may be assumed that ambient light of substantial intensity falls on the screen at both its front and rear sides, typically striking the screen in the various directions indicated by the arrows 13. The purpose of the unique construction of the screen is to avoid any adverse effect on the contrast of the viewed image as a result of the ambient light falling on the screen from the directions 13, or the location of the viewer or any other location other than that of projector 11.

Figure 2:
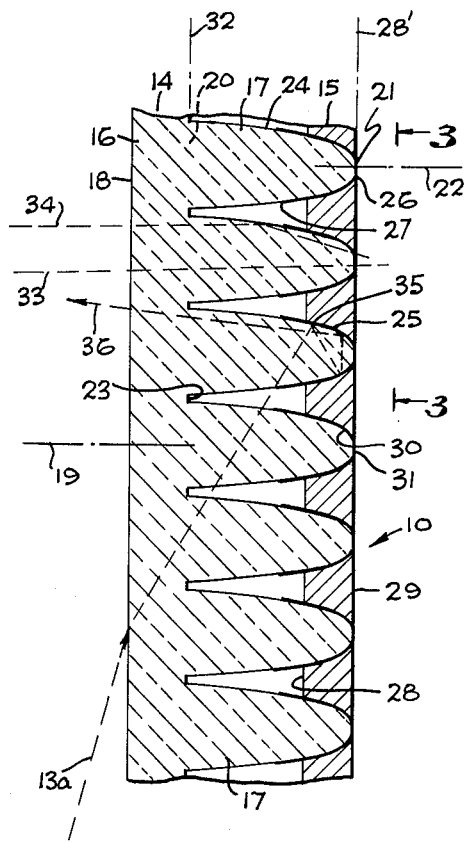
FIG. 2 is an enlarged fragmentary section through the screen of FIG. 1, and taken on line 2—2 of FIG. 1.
Figure 3:
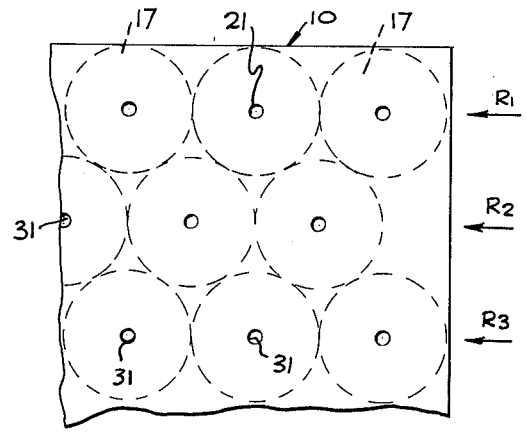
FIG. 3 is a fragmentary view taken on line 3—3 of FIG. 2, and showing the appearance of the viewing side of the screen.

As seen in FIG. 2, screen 10 is formed essentially of two interconnected sheet-like elements 14 and 15. Element 14 forms essentially a flat sheet 16 of transparent material, such as glass or a suitable transparent resinous plastic material, having a large number of transparent light guides 17 taking the form of lugs carried by and preferably integral with sheet 16. The left surface 18 of element 14 may be planar, and disposed transversely of the main optical axis 19 of projector 11. Light guides 17 project from the right side of element 14, and may all be of identical configuration. Each of these guides 17 tapers from a relatively large cross-section at its light inlet end 20 to a considerably reduced cross-section at its light outlet or discharge end 21. As will be apparent from FIG. 3, the cross-sectional area of the light inlet end 20 of each light guide is preferably many times as great as the cross-sectional area of the light discharge end. In the arrangement of FIGS. 2 and 3, the cross-section of each of the light guides 17 is at all points circular, with the guides being centered about individual axes 22 disposed parallel to main optical axis 19 of the projector and screen. Between the large inlet ends 20 of the different light guides 17, element 14 may form planar surfaces 23 disposed parallel to surface 18. Also, for optimum results, the light guides 17 as viewed in axial section (FIG. 2) are of parabolic configuration. That is, each of the light guides 17 may be considered as having its outer surface 24 formed by the revolution of a parabola about the individual axis 22 of that particular light guide. When the screen is in use, the outer surfaces 24 of the light guides 17 act to reflect some light internally within the light guides to transmit the image to their discharge ends 21.

About the smaller dimension ends of guides 17, there may be applied a coating of highly reflective material 25, such as silver or aluminum, this coating extending from the point 26 in FIG. 2 to point 27. Thus, at the locations of the reflective coatings 25, light is reflected internally within guides 17 by these coatings, as well as by the guide surfaces to which these coatings are applied. At the very tip ends 21 of guides 17, coatings 25 are discontinued to form circular light passing outlet ends of the guides, which may be ground off to lie in a plane 28 extending transversely of axis 19. These circular tip ends 21 of the guides are preferably rendered translucent, that is, are given a capacity to diffuse light, as by applying a translucent paint to the discharge ends of the light guides, or by merely applying a small amount of solvent to those ends of the guides where the guides are formed of plastic, so that the solvent slightly dissolves and renders translucent the surface portion of the discharge ends of the light guides.

In the form of the invention shown in FIGS. 1 to 3, the sheet 15 is formed of a highly light absorptive, non-reflective material, which will absorb at least about 90 percent of the light falling on it on the right or viewing side of the screen, and will not reflect (either specularly or diffusely) more than about 10% of the light falling on it from the viewing side. For optimum results, the material of sheet 15 should absorb substantially all of the light falling on it, and should not reflect any substantial portion of that light. Sheet 15 may be essentially a flat sheet, defined at its opposite sides by two parallel surfaces 28 and 29 disposed perpendicular to main axis 19 of the screen. Light guides 17 project through and are nested in closely fitting relation within individual openings 30 formed in sheet 15, so that the opaque end surfaces 31 of the light guides lie in essentially the same plane as surface 29 of sheet 15. Sheet 15 may, as an example, be formed of a black nonreflective polyethylene, suitably bonded to light guides 17 at the locations of passages or openings 30. As will be apparent from FIG. 3, the various light guides 17 are arranged in a regular pattern, such that the guides are distributed uniformly across the area of the screen, desirably being arranged in a number of horizontal rows R-1, R-2, R-3 etc., with the guides in successive rows being staggered as shown. The light inlet ends 20 occupy the major portion of the cross-sectional area of the screen, in the transverse plane 32 within which these inlet ends lie, and preferably occupy at least about 90% of the area of the screen in that plane. The small outlet ends 21 of the light guides 17, on the other hand, occupy only a very small percentage of the cross-sectional area of the screen at plane 28; preferably less than about 3% of that area.

To now describe the manner of operation of the screen illustrated in FIGS. 1 to 3, assume that projector 11 is energized to project an illuminated image onto the left side of the screen as viewed in FIGS. 1 and 2. It will be apparent that different portions of this image will enter different ones of the light guides, through the enlarged diameter inlet ends 20 of the guides. Some of the light rays thus entering a particular guide, for example the ray designated 33 in FIG. 2, may pass entirely through the transparent guide to its translucent discharge end face 31 without reflection of any type. Other rays entering a particular guide, for example the ray designated 34 in FIG. 2, will enter the inlet end 20 of the guide, and then strike and be internally reflected by surface 24 of the guide. Due to the parabolic cross-section of the guides, any such ray from the projector will be reflected by surface 24, or by reflective coating 25, in a manner such that after a single reflection the ray will strike translucent end surface 31 of the guide. To the left of coatings 25, surfaces 24 of the wave guides extend generally parallel to axes 22 of the guides, and therefore the light rays from projector 11 strike these portions of surfaces 24 at relatively slight grazing angles, such that there is total reflection of the light rays to the outlet ends of the guides. At the locations of coatings 25, on the other hand, the angularity of surfaces 24 with respect to axes 22 is somewhat greater, and might permit passage of the light rays through these surfaces without reflection if it were not for the presence of the aluminum or silver coatings 25.

The viewer at location 12 in FIG. 1 sees the various translucent circles 31 at the outlet ends of the light guides, illuminated in correspondence with the amounts of image light which enter the inlet ends of the guides. The various spots 31 are in actuality spaced apart very short distances, and in particular should be spaced closely enough that the human eye can not distinguish between two adjacent spots from the intended viewing distance. Stated more technically, the apparent angular separation of the luminous spots as seen from the intended viewing position should not exceed 1° of arc. The eye thus mentally spreads the light from two adjacent spots 31 sufficiently to cause them to appear to merge together, and occupy the space of opaque material 15.

Since material 15 is not reflective, either specularly or diffusely, any light striking surface 29 of sheet 15 from the viewing side of the screen will be absorbed, and not reflected, and will not be seen by the viewer. Thus, this light can not affect the contrast of the viewed image. As for stray light approaching screen 10 from its rear side, say for example along the line designated 13a in FIG. 2, any such light, coming from any direction other than that of projector 11, will be reflected internally within guides 17 in a manner ultimately causing the light to either enter and be absorbed by the material 15, or be reflected back outwardly through the left end of the guide, and thus not be seen by the viewer. For example, the ray 13a may pass through two of the guides 17 without reflection, then strike the coating 25 of a third guide at 35, and at a sufficiently sharp angle that, after one or more further reflections, the ray will ultimately leave that guide 17 through its left end at 36. The tapering configuration of the guides causes most of the stray rays coming from points other than the projector to be rejected in this manner.

Figure 4:
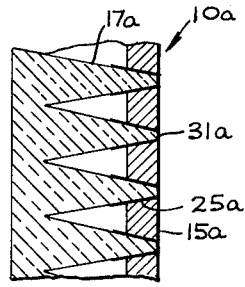
FIGS. 4, 5 and 6 are views similar to FIG. 2, but showing the construction of three variational forms of screen embodying the invention.

FIG. 4 is a view similar to FIG. 2 showing a slightly different form of the invention, in which the screen 10a may be the same as that of FIGS. 1 to 3 except that guides 17a are of frustro-conical configuration, rather than of parabolic axial section. The opaque light absorptive sheet 15a may be the same as in the first form of the invention, as may the aluminum or silver coating 25a, and the translucent circular small dimension outlet ends 31a of the guides. The functioning of screen 10a of FIG. 4 is the same as that of FIG. 2, except that the frustro-conical type of light guide may require more internal reflections of a particular light ray before the ray reaches outlet end 31a. As in the first form of the invention, the guides reject and reflect back to the left any stray rays approaching the guides at angles greater than the angle at which the projector itself directs light into the guides.

Figure 5:
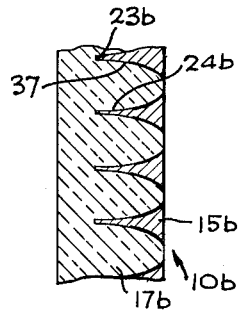

FIG. 5 shows another form of screen 10b, which is the same as that of FIG. 2 except that the opaque light absorptive and nonreflective material 15b extends farther to the left between guides 17b, and in fact completely fills the spaces between these guides up to the locations of surfaces 23b at the light inlet ends of the guides. This arrangement facilitates the absorption of stray rays approaching the screen from unwanted angles at its projection side, since the leftwardly projecting fingers or portions 37 formed by material 15b will readily absorb any such rays if they pass through the surfaces 24b to the left of reflective coatings 25b.

Figure 6:
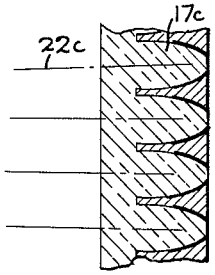

FIG. 6 represents another form of the invention, which is the same as that of FIG. 5 except that the axes 22c of light guides 17c, instead of being disposed parallel to one another, are at slight angles to one another, such that all of these axes point directly to projector 11, and intersect at the projector. Such facing of the inlet ends of guides 17c directly toward the projector of course facilitates the proper acceptance of the light from the projector by the guides, and assures a uniform treatment of all portions of the image by the different guides.

Figure 7:
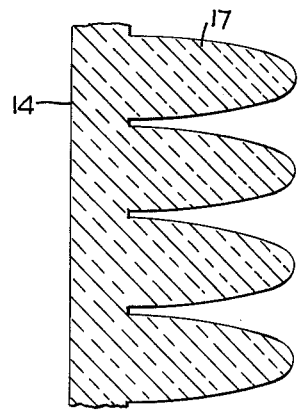
FIGS. 7, 8, 9, 10 and 11 are fragmentary sectional views representing five steps in the preferred method of manufacturing the screen of FIGS. 1 to 3.
Figure 8:
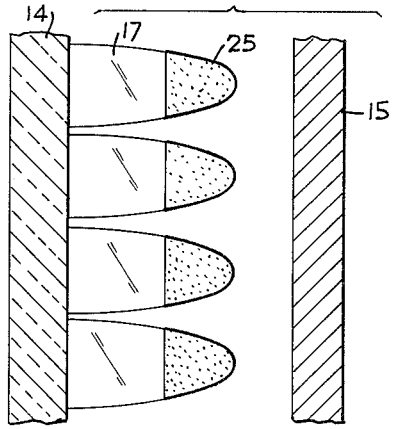
Figure 9:
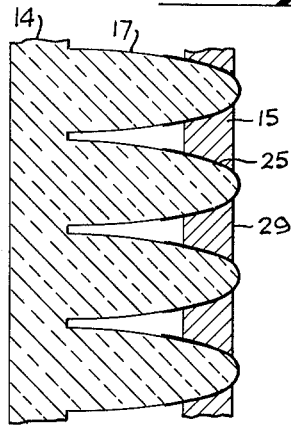
Figure 10:
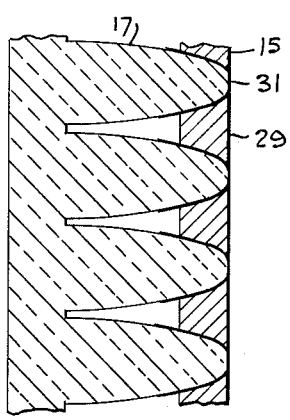
Figure 11:
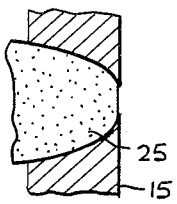

FIGS. 7 through 11 represent a preferred method of forming the screen of FIG. 2. As shown in FIG. 7, the first step in this method may be that of forming the element 14, preferably by molding this element from a suitable plastic material, such as a transparent polystyrene or a transparent vinyl resin. As thus molded, the element 14 may be identical with that shown at FIG. 2, except that the tip ends of guides 17 may be rounded, rather than being cut off at the transverse plane. After formation of element 14, the right hand ends of guides 17 may be coated by the highly reflective aluminum or silver 25, as seen in FIG. 8. Next, element 14 is assembled with opaque sheet 15 to the FIG. 9 condition. This may if desired be done by first forming the properly shaped passages or openings 30 in sheet 15, and then moving the parts together and cementing them in assembled relation. However, a preferred way is to initially provide sheet 15 as a layer of black nonreflective polyethylene or similar material, without the openings being formed therein, as seen in FIG. 8, then heating element 14 and particularly its lugs 17 to a temperature above the melting point of the polyethylene, and moving the heated lugs against the polyethylene to locally melt it so that the lugs can be forced through the polyethylene to the condition of FIG. 9. As the polyethylene then hardens, it will bond tightly to the reflectorized coatings of the lugs or light guides 17. After the parts have been assembled to the FIG. 9 condition, with the rounded tip ends of guides 17 projecting slightly beyond surface 29 of part 15, these tip ends may be ground off slightly to be flush with surface 29, see FIG. 10, and the end faces 31 may then be rendered translucent, preferably by applying a small amount of a suitable solvent to the flattened tip ends 31 of guides 17, to slightly dissolve the end surface of each guide and cause it to harden to a translucent or crazed condition as represented in FIG. 11. Where element 14 and its carried light guides 17 are formed of polystyrene, the solvent employed for this purpose may be ethyl acetate or methyl ethyl lactone.

Figure 12:
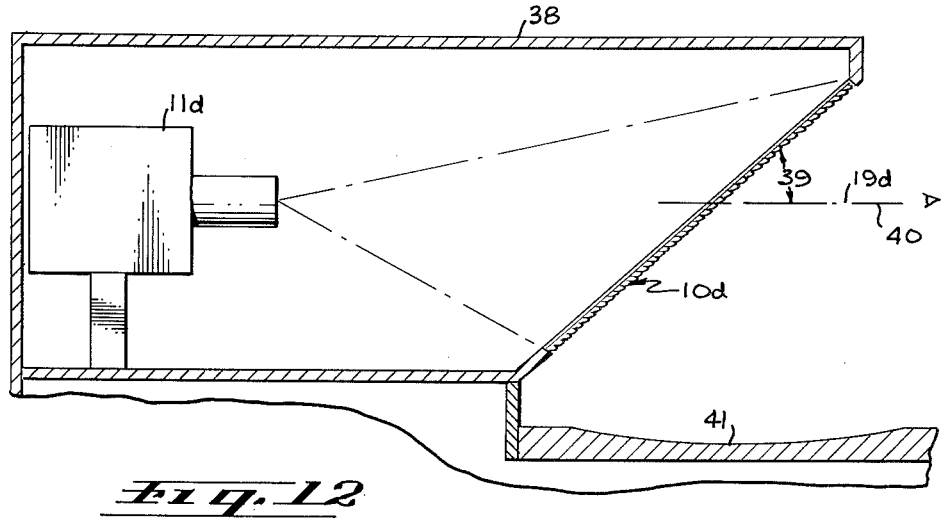
FIG. 12 is a vertical section through another rear projection system utilizing a screen made in accordance with the invention.
Figure 13:
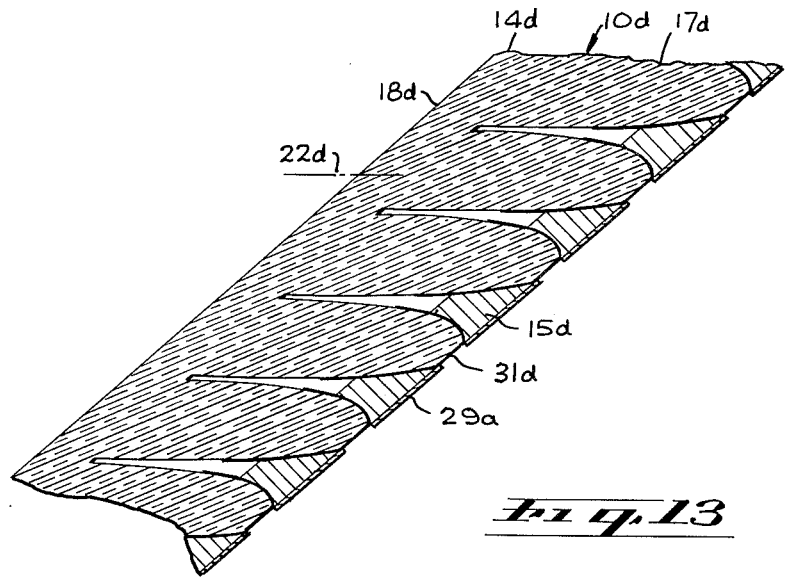
FIG. 13 is an enlarged fragmentary vertical section through the screen of FIG. 12.

FIGS. 12 and 13 show another rear projection arrangement to which the invention may be applied. Certain features of the overall arrangement illustrated in FIG. 12 have been disclosed and claimed in my copending application Serial Number 88,889, of which the present application is a continuation-in-part. In FIG. 12, the projector 11d is contained within an enclosed housing 38, which carries a rear projection screen 10d at its forward side. Screen 10d is in this case inclined at a very substantial angle 39 to the main optical or projection axis 19d of the projector. The image on screen 10d is viewed from its right side, as seen in FIG. 12, along a line designated 40. Beneath the screen, there is provided a light trap 41, which may consist of a material having a dark substantially totally light absorptive, nonreflective upper surface, which will absorb any light falling on this surface.

As seen best in FIG. 13, the screen 10d may be basically very similar to screen 10 of FIG. 2. However, in FIG. 13, the axes 22d of light guides 17d are disposed at an angle to rear face 18d of element 14d, and at a corresponding angle to the forward sheet 15d, so that surface 18d and sheet 15d may be disposed at the inclination angle 39 to main projection axis 19d, while the individual axes of the various light guides 17d are disposed parallel to, or substantially parallel to, axis 19d. Thus, the rear entrance ends of the light guides are aimed generally toward the projector, to properly receive the image light and direct that light to the opaque discharge ends 31d of the light guides, while rejecting light approaching the rear of the screen from other angles. In the arrangement of FIGS. 12 and 13, it is contemplated that the forward inclined surface of element 15d may if desired be rendered specularly reflective (as by provision of a silver or aluminum coating 29a thereon), rather than being substantially totally absorptive of light, since, in accordance with the teachings of my prior application, the element 41 is so dimensioned and so positioned that any light reflected by the surface 29a to the viewing location can only come from the area occupied by element 41. Because element 41 is substantially totally absorptive, no light can emanate from this element, and therefore the specular reflectivity of surface 29a can not result in the reflection of any light rays to the viewing location along line 40, and can not adversely affect the contrast of the viewed image. It will be apparent, however, that surface 29a should not have substantial diffuse reflectivity. Stated differently, the surface 29a should be a surface of low diffuse albedo, desirably less than 10%, and for best results not more than about 1%. This is also of course true of the corresponding surface 29 of the other forms of the invention, but it is further desired in the case of surface 29 that it have not more than about 10%, and preferably less than about 1%, specular as well as diffuse reflectivity.

I claim:

1. A rear projection screen having a first side onto which an image is projected and second side at which said image is viewed, said screen comprising two interconnected sheet-like elements, one of said sheet-like elements being formed of transparent material having a large number of light guides formed integrally on one surface thereof, said light guides comprising lugs having inwardly reflective surfaces which reflect inwardly light passing through the guides and which taper in advancing from said first side of the screen toward said second side to form relatively large cross-section inlet ends of the guides near said first side of the screen and smaller cross-section outlet ends near said second side of the screen, said lugs having coatings of highly reflective material forming portions of said inwardly reflective surfaces and extending about only the portions of the lugs adjacent said outlet ends thereof, said second sheet-like element containing openings of a number, size, configuration and spacing corresponding to said lugs and receiving said lugs in closely fitting relation in said openings, said outlet ends of the lugs being uncovered, translucent, and substantially coextensive with the outer surface of said second sheet-like element, said second element being of a thickness less than the extent of said reflective coating.

2. A rear projection screen as recited in claim 1, in which said lugs are conical.

3. A rear projection screen as recited in claim 1, in which said lugs are of parabolic axial section.

References Cited by the Examiner

UNITED STATES PATENTS

| | | | |
|---|---|---|---|
| 530,817 | 12/1894 | Aumont | 18—59 |
| 2,292,152 | 8/1942 | Newcomer | 88—28.93 |
| 2,738,706 | 3/1956 | Thompson | 88—28.93 |
| 2,962,409 | 11/1960 | Ludlow et al. | 18—59 |

FOREIGN PATENTS 180,418   12/1954   Austria.

JULIA E. COINER, *Primary Examiner.*